(12) United States Patent
Fairchild

(10) Patent No.: US 6,229,440 B1
(45) Date of Patent: May 8, 2001

(54) CARTRIDGE DRIVE DOOR SYSTEM

(75) Inventor: Scot C. Fairchild, Santa Clara, CA (US)

(73) Assignee: TeraStor Corporation, Milpitas, CA (US)

( * ) Notice: Subject to any disclaimer, the term of this patent is extended or adjusted under 35 U.S.C. 154(b) by 0 days.

(21) Appl. No.: 09/439,943

(22) Filed: Nov. 12, 1999

(51) Int. Cl.[7] ................................................ G08B 13/08
(52) U.S. Cl. .................................... 340/545.6; 361/685
(58) Field of Search .............................. 340/542, 545.6; 70/158, 160; 312/223.2, 216; 361/685

(56) References Cited

U.S. PATENT DOCUMENTS

| | | | |
|---|---|---|---|
| 4,794,587 | * 12/1988 | Cordiano | 369/292 |
| 5,264,986 | * 11/1993 | Ohgami et al. | 361/685 X |
| 5,305,180 | * 4/1994 | Mitchell et al. | 361/685 |
| 5,347,425 | * 9/1994 | Herron et al. | 361/683 |
| 5,717,571 | * 2/1998 | Helot | 361/685 |
| 5,959,834 | * 9/1999 | Chang | 361/685 |

* cited by examiner

Primary Examiner—Thomas Mullen
(74) Attorney, Agent, or Firm—Fish & Richardson P.C.

(57) ABSTRACT

An apparatus opens, closes and locks a data storage device door. The apparatus includes a linkage adapted to actuate the door, the linkage having a handle with a notch and an edge; a flag having a pin mounted thereon, the pin being adapted to engage the edge when the door opens and to be seated in the notch when the door is locked; and a lever to actuate the flag.

20 Claims, 8 Drawing Sheets

CARTRIDGE DRIVE DOOR SYSTEM

The present invention relates to a cartridge door system for a removable data storage device.

The rapid growth of digital content and the convergence of information and communications technologies are driving the growth of affordable, high-capacity data storage solutions. For example, modern multimedia applications such as video editing and immersive imaging can generate large files. Numerous data storage solutions, each differing in architecture, capacity, performance, reliability, and cost, have evolved to quench users' thirst for economical and high capacity data storage systems.

Generally, data storage devices can be stand-alone units that communicate with a computer system by cable, or they can be internal units that occupy a slot, or bay, in the computer system. Since applications such as video editing and immersive imaging can generate files that are each multi-gigabytes in size, disk drives of the type that accept removable disks have become increasingly popular. These disk drives are also convenient since users can incrementally add storage capacity as needed and/or use the removable disks as back-up copies.

For purposes of convenience and protection, the platter or disk may be mounted within a shuttle, which in turn is positioned inside an enclosure or a cartridge. During operation, the cartridge is inserted into an insertion port of the drive. The insertion port typically has a door that is opened to receive a cartridge. A button, or similar type of manually-actuated member, is provided to permit the user to open the door of the device for the insertion and/or removal of compact disks. The behavior of the computer in response to the actuation of this button varies, in dependence upon the current state of the computer system. For example, in computers that employ the Macintosh Operating System, when no disk is present in the drawer, actuation of the button causes the drawer to open, so that the user can insert a cartridge. Thereafter, when the door is closed, the computer's operating system reads descriptive information from the volume and stores that information in memory in a process called mounting. Once a cartridge has been mounted, the manually operated button is disabled, and the user is not able to eject the cartridge by merely actuating the button. This functionality prevents inadvertent releases of the cartridge while information is being accessed from it, for example.

After the cartridge has been inserted into the port, the shuttle is moved inside the drive, and the platter or disk is then conveyed to a predetermined position. At this point, the cartridge can be removed. The drive door is then secured or locked to prevent a user from "prying" with the drive when it is operating.

When the user is finished using the platter or disk, an electronic or manual command is issued to open the drive door to expose the port. The cartridge is inserted into the port, causing the platter or disk to be moved back into the shuttle that in turn is retracted back inside the cartridge. Once the shuttle is secured inside the cartridge, the cartridge can then be removed by the user. After the cartridge has been removed, the door is again secured to protect components inside the drive against damage.

SUMMARY

The invention provides an apparatus that opens, closes and locks a door. The apparatus includes a linkage adapted to actuate the door, the linkage having a handle with a notch and an edge; a flag having a pin mounted thereon, the pin being adapted to engage the edge when the door opens and to be seated in the notch when the door is locked; and a lever to actuate the flag.

Implementations of the invention include one or more of the following. A preload lever can be connected to the lever. The preload lever can be spring-loaded. A torsion spring can be connected to the flag. The flag includes an arm adapted to enable or disable a signal to indicate door status. A door motion detector can be connected to the arm. A drive processor can receive the output of the detector. The detector can be an opto-coupler having a recess to receive the arm. A cam-gear can be connected to the lever. The cam-gear can drive the lever through a predetermined path.

Advantages of the invention include one or more of the following. The invention provides a simple, low-cost and reliable system for opening, closing, preloading and locking a drive door. The drive door can be held open without damaging the drive system. The drive door also self-locks during a normal operating condition when the drive door closes and during an abnormal operating condition when the door is forced or jammed open and subsequently released. The invention safely releases the drive door at predetermined safe operating positions to prevent damage to the media caused by inappropriate cartridge insertions or ejections. Thus, the invention protects against damaging sensitive components internal to the drive if they collide with any foreign objects associated with the insertion of an incompatible object.

The invention also provides a natural logical user interface for both personal and library applications with the drive. The interface requires that the cartridge be removed and the drive door be locked before the drive can continue operation.

The invention also provides a sensing system to notify the drive that the door has been secured. This information is used to by a drive controller to enable data access and other operations such as mounting the drive volume after a cartridge has been accepted.

The aforementioned advantages are achieved without increasing the complexity of the drive, thereby increasing the performance and reliability of the entire system.

BRIEF DESCRIPTION OF THE DRAWINGS

The foregoing and other features, aspects and advantages of the invention will become better understood with regard to the following description, appended claims and accompanying drawings in which:

DETAILED DESCRIPTION

Figure 1A:
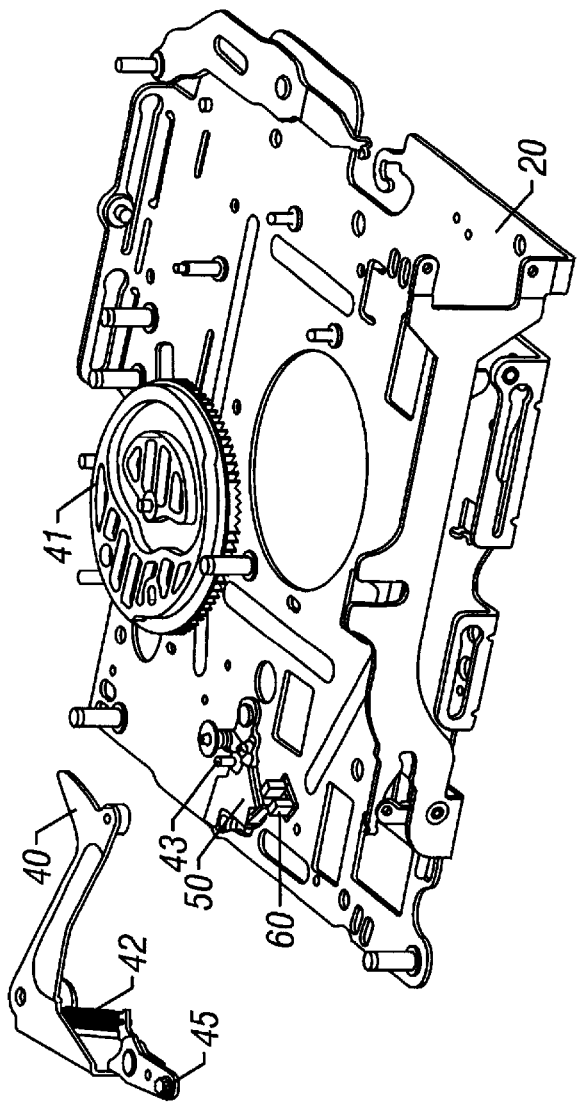
FIG. 1A is an exploded view of a door assembly in conjunction with a latch in accordance with the invention.
Figure 1A:
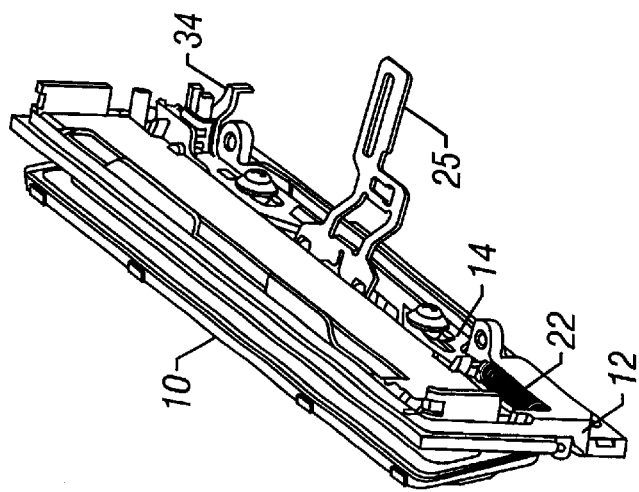
Figure 1B:
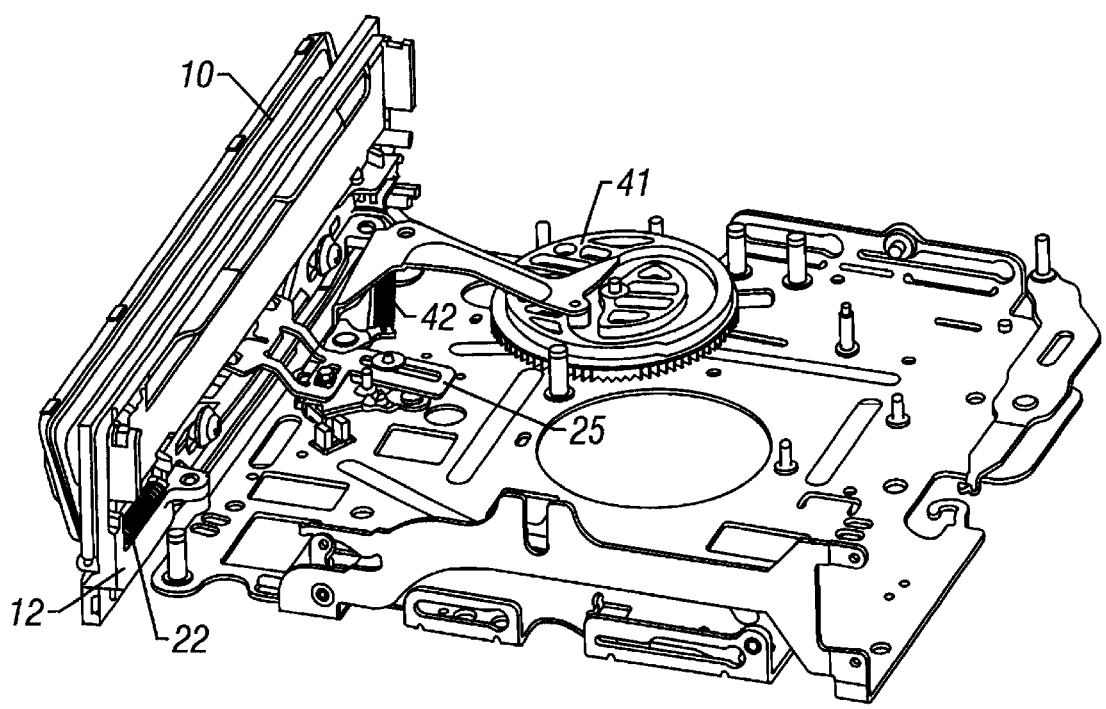
FIG. 1B is an assembled view of the door assembly of FIG. 1A.

FIGS. 1A and 1B show a door assembly that allows a cartridge to latch under predetermined timing conditions. A door frame 12 provides structural support for receiving a cartridge. An outside door 10 is rotatably connected to the door frame 12 through pins 110 that hinge the door to the frame 12. In this manner, the outer door 10 can rotate. A substantially closed position exists in which the outer door 10 is substantially parallel to the door frame 12, thereby forming a sealed compartment to protect media inside of the compartment. An open position positions the outer door 10 to substantially an extension of the base of the drive. This exposes a port through which a cartridge can be inserted or removed. In general, a user cannot manually open the outer door 10, but instead, the drive actuates a door handle 25, which causes the outer door 10 to move from the substantially closed position to the open position.

The frame 12 also contains an inner door 13 that is normally in a substantially closed position. When a cartridge is inserted, the inner door 13 flips to a substantially open position to allow the drive access to a shuttle in the cartridge. The inner door 13 swings upward when the cartridge is inserted.

The frame 12 can receive a lockslide or latch 14 that can move horizontally within a predetermined tolerance. The latch 14 has guides that allow the latch to be moved from a closed position to an open position when a cartridge is inserted into the drive. A spring 22 connects a hook located at one end of the latch 14 to a hook mounted on the door frame 12. The spring 22 resiliently provides an appropriate tensioning force on the latch 14, to move the latch 14 from its open position to its closed position. At the front of the other end of the latch 14, a sensor flag 34 is provided that is used to indicate cartridge insertion.

FIG. 1A shows a cam 41 mounted on top of a body assembly 20. The body assembly 20 provides structural support and protects mechanical and electrical components of the drive from interference and/or damage caused by external objects. The cam 41 is rotatably driven by gears that are actuated by a motor (not shown). The cam 41 drives a lever 40 through a timing path to rotatably move the lever 40 in a predetermined close-ended path. The lever 40 in turn is connected to a preload pin 45 and spring loaded through a spring 42. As explained in more detail below, the combination of the cam 41, the lever 40, the preload pin 45 and the handle 25 moves the door 10 from an open position to a closed position and vice versa.

Figure 2A:
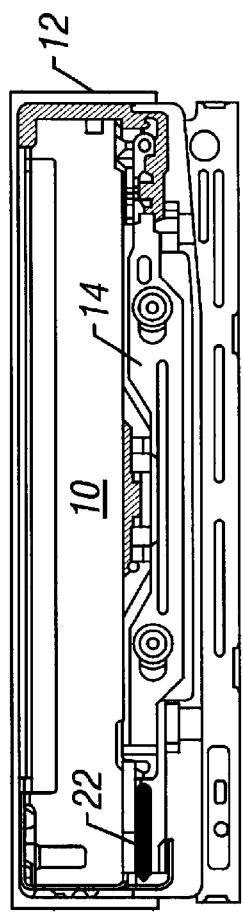
FIGS. 2A, 2B, and 2C are perspective front, top and side views of the door assembly of FIG. 1, respectively.
Figure 2C:
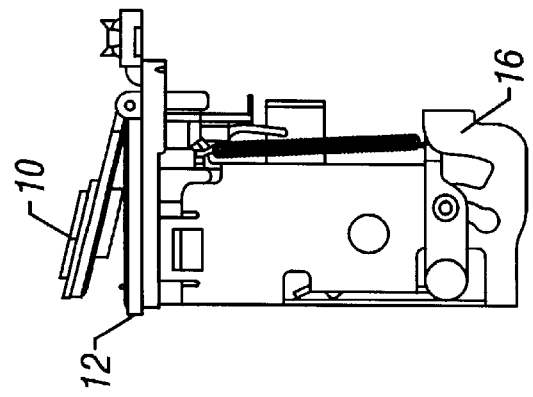
Figure 2B:
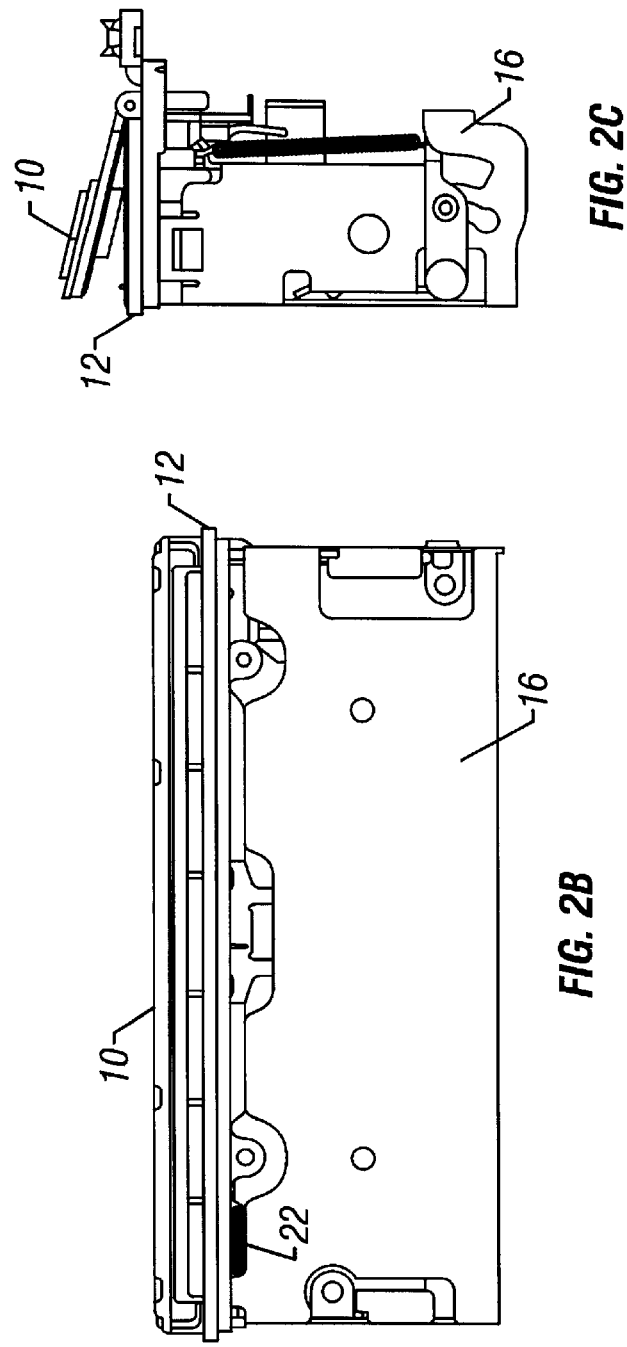

FIG. 1B shows an assembled view of the door assembly of FIG. 1A. FIGS. 2A–2C also show views of the door assembly that correspond to front, top and side views, respectively. Upon request by the user or software, a drive microprocessor instructs a loader motor to rotate the lever 40 to open the drive door 10. When the lever 40 rotates, a lock pin 43 laterally pushes a lock 52 aside so that the drive door 10 can open. The lock 52 and a flag 50 move together such that, when the lock 52 moves aside, the flag 50 also moves and has a tailing position that blocks a photo-sensor 60 (see e.g., FIG. 1A). The blocked photo-sensor 60 then signals a drive microprocessor that the drive door 10 is open or vice versa.

When the drive door 10 is opened, the latch 14 is "primed" and ready to accept a cartridge. As the cartridge is inserted, shaped positions (such as fingers or tabs) on the cartridge bottom contact the latch 14. This contact causes the latch 14 to slide sideways. When the latch 14 has moved a maximum sideways distance, it rests on top of a tab plateau. As the cartridge is inserted further into the drive, the latch 14 moves off the plateau on the tabs of the cartridge and finally drops into a perpendicular surface that locks the cartridge into the drive. Once the cartridge is locked securely in the drive, the loader moves a shuttle from the cartridge into the drive.

Figure 3A:
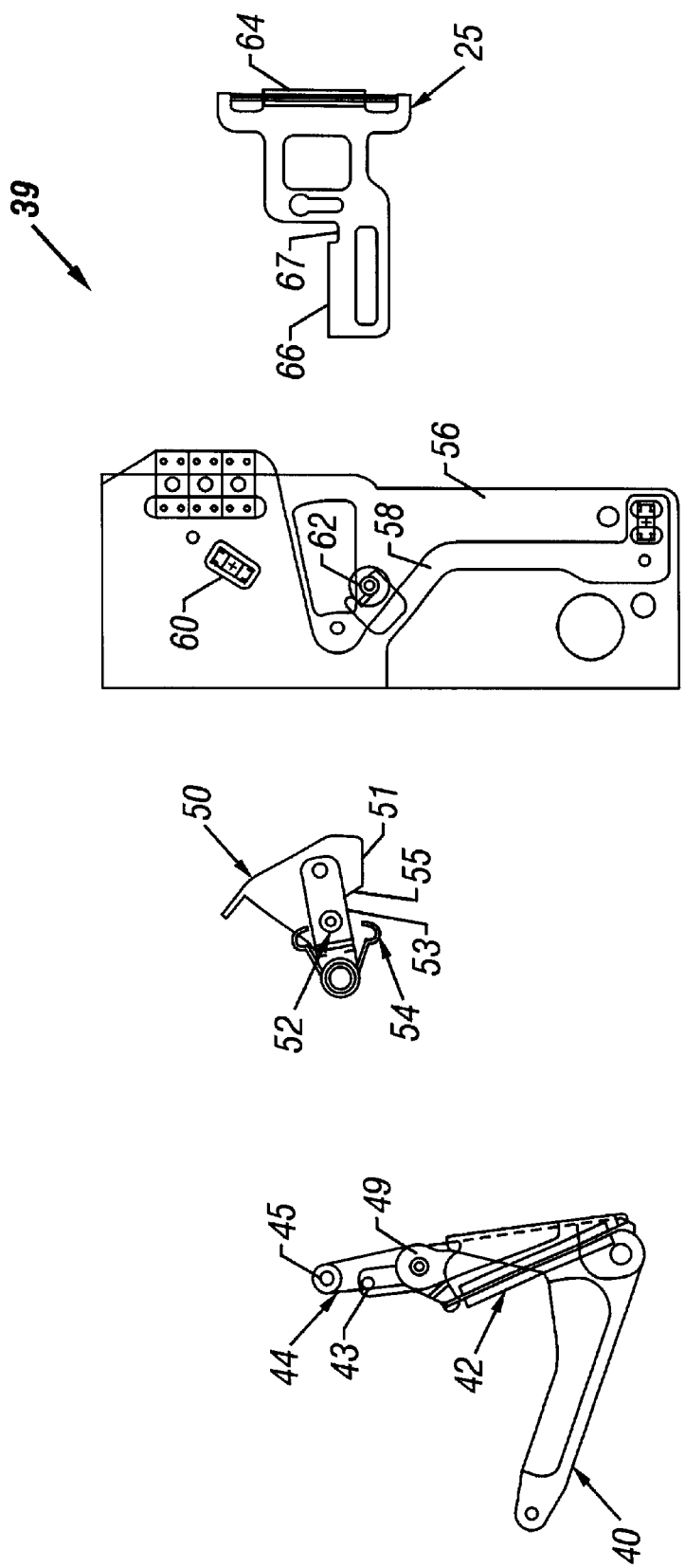
FIG. 3A shows exploded top views of components of a door assembly.

FIG. 3A shows in more detail components associated with a cartridge drive door assembly 39. One tip of the lever 40 is hingeably connected to the center of a preload arm 44 using a pin. The second tip is connected to the lever 40 by a spring 42. The other tip of the preload arm 44 is secured to the preload pin 45. The preload pin 45 engages and moves along edges 51, 53 and 55 of the flag 50. When the door 10 is at its open position, the preload pin 45 engages the flag 50 at the edge 51.

Correspondingly, when the door 10 is at its closed position, the preload pin 45 engages the flag 50 at the edge 53. Moreover, the edge 55, which connects the edges 51 and 53, is angled to provide a smooth transition for the pin 45.

The lock pin 52 is mounted above the flag 50. The lock pin 52 slides along an edge 66 of the link 25. When the preload pin 45 is positioned at the edge 55, the lock pin 52 in turn is positioned at a notch 67 that is located at one end of the link edge 66. The door 10 is considered to be locked when the lock pin 52 is seated in the notch 67 of the link 25.

The flag 50 and the lock 52 is spring loaded using a torsion spring 54. The flag 50 rotatably moves through a photo-sensor 60 to pass or block a light beam. The passing or blocking of the light beam causes the photo-sensor 60 to generate a signal to a drive microprocessor to signal that the door 10 is open.

The sensor 60 is mounted on a flexible printed circuit board (flex PCB) 58. The flex PCB 58 is in turn mounted on a sheet metal housing 56. The sheet metal housing 56 is adapted to receive the link 25 using a roller 62. The roller 62 limits the link 25 to travel in one axis only to move the door 10 from its closed position to its open position and vice versa. The link 25 also has a handle 64 that is adapted to engage the drive door 10.

Figure 3B:
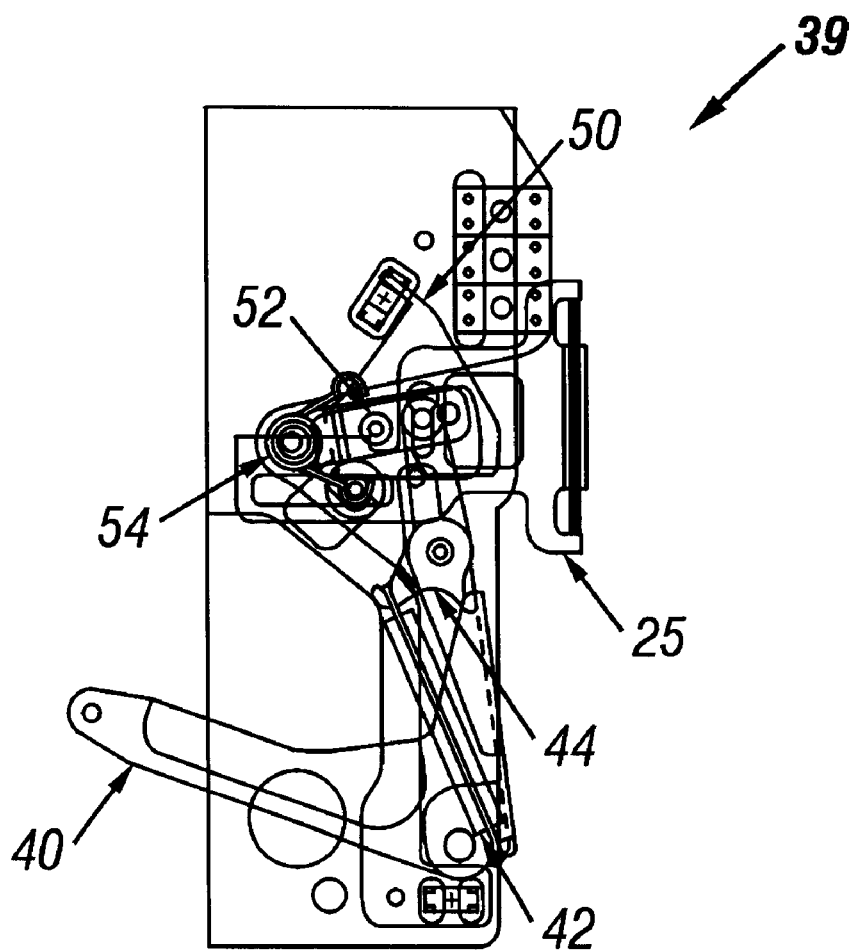
FIG. 3B shows the assembled door assembly with the components of FIG. 3A.

FIG. 3B shows an assembled cartridge drive door assembly 39. Correspondingly, FIG. 3C shows the drive door assembly 39 when the drive door 10 is in a closed position, while FIG. 3D shows the drive door assembly 39 when the drive door 10 is in an open position.

Viewing FIGS. 3A–3D in combination, whenever the drive door 10 is retracted from an opened position, the edge 66 of the link 25 holds the flag 50 in position to block the photo-sensor 60, thus, notifying the drive microprocessor that the drive door 10 is open. When the drive door 10 is closed and needs to be opened, the lever 40 rotates. When the lever 40 first rotates, the lock pin 43 laterally pushes the lock 52 aside so that the drive door 10 can open. The lock 52 and the flag 50 move together such that, when the lock 52 moves aside, the flag 50 also moves and blocks the photo-sensor 60. The blocked photo-sensor 60 then signals the drive microprocessor that the drive door 10 is open or vice versa.

During the door closing sequence, when the door 10 encounters an obstacle, the door 10 stops. The preload lever 49 in turn stops, and the preload spring 42 stretches. The door lever 40 continues to move, but the door remains ajar due to the obstacle. Since all components move within their expected range of motion, no undue force is exerted on any single components as a result of the obstacle. In this manner, the system of FIGS. 3A–3D safely handles unexpected obstacles and avoids damaging components of the system.

Figure 3C:
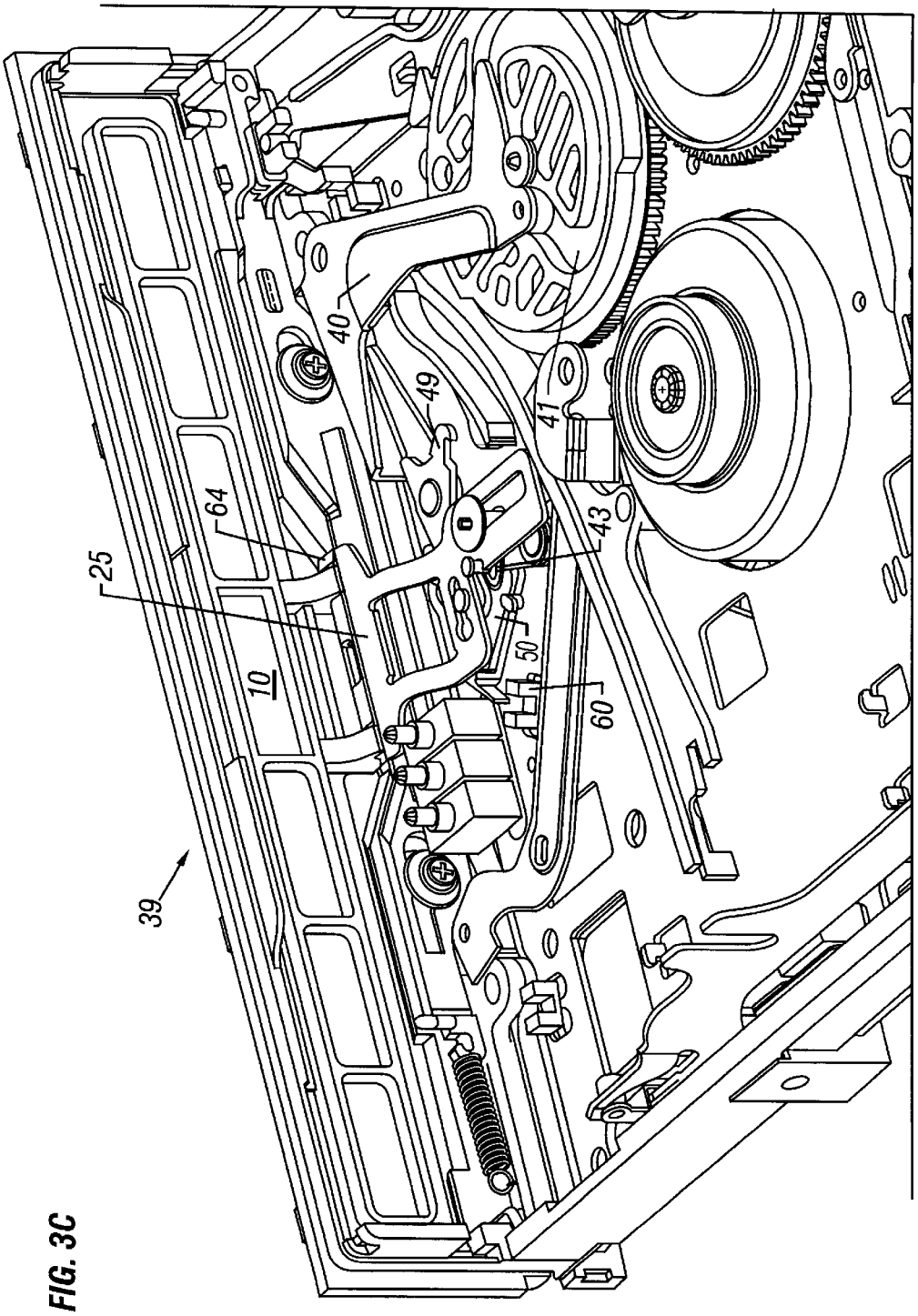
FIG. 3C shows the door assembly operating in a closed door configuration.
Figure 3D:
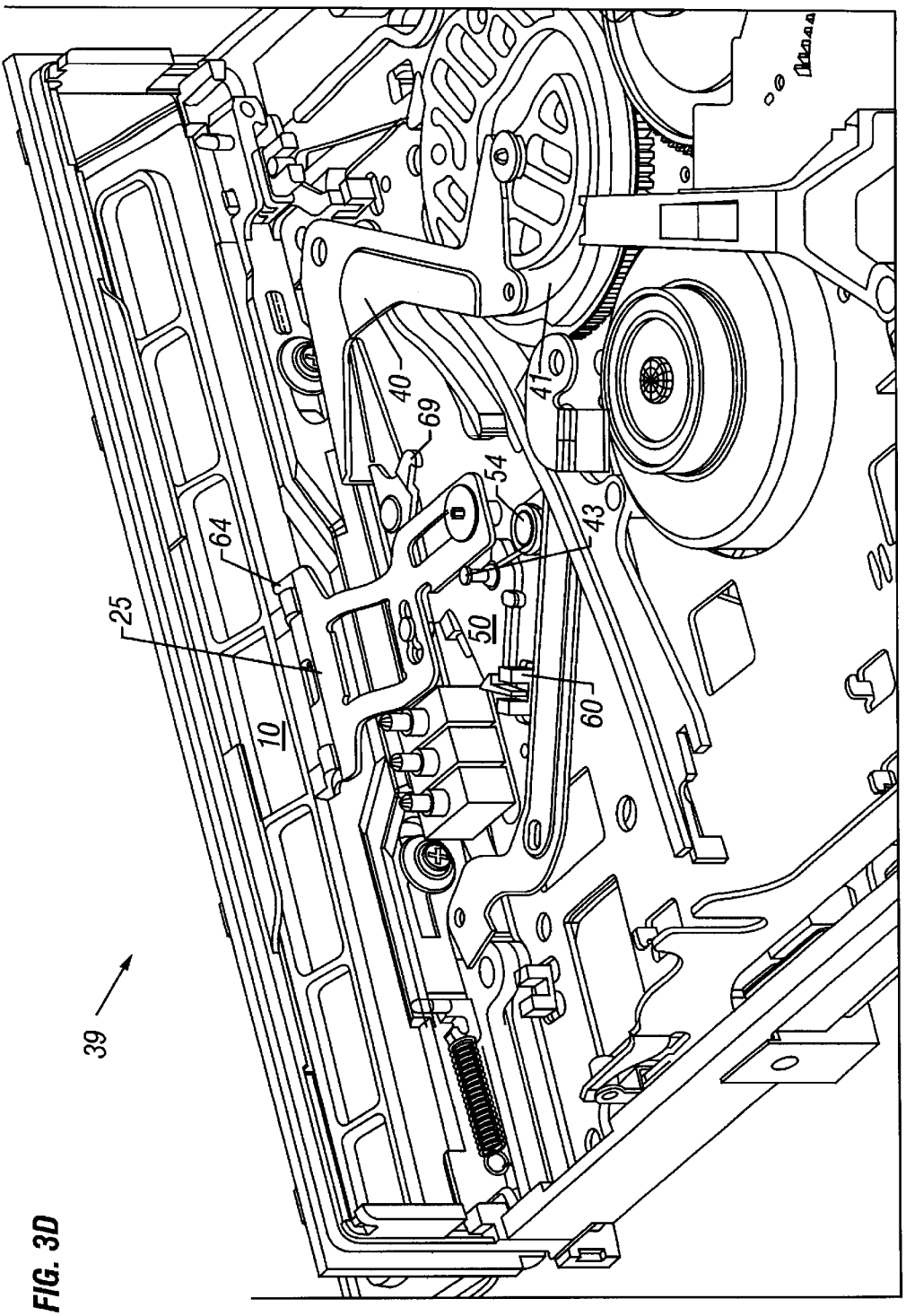
FIG. 3D shows the door assembly operating in an open door configuration.

Referring now to FIG. 3C, when the door 10 opens from a closed position, the cam gear 41 moves the lever 40. The movement of the lever 40 in turn causes the preload lever 49 to become spring loaded. The preload lever 49 moves from a closed position and the pin 43 pushes the flag 50 outwardly from its locked position. Simultaneously the preload lever 49 is released or "unpreloaded." The released preload lever 49 pushes on the linkage 25 to open the door 10.

Referring now to FIG. 3D, when the door 10 is in an opened position, the lever 40 moves toward a first position in order to close the door 10. However, if an obstacle, such as an object or a user's finger, forces the door 10 open, the lever 40 continues to move but the preload spring 42 allows the door to stay open. When the lever 40 moves back to the first position, the flag 50 is no longer controlled by pin 43 that releases the flag 50. The edge 66 of the linkage 25 keeps the flag 50 from going to the closed position. Until the obstacle is removed, the flag 50 remains in the closed position. As the obstacle is removed, the door 10 can be closed. During the closure of the door 10, the flag 50 moves into a locked position. In this position, the user can not reopen the door unless he or she pushes an eject button or otherwise causes the door 10 to open under software control.

Figure 4:
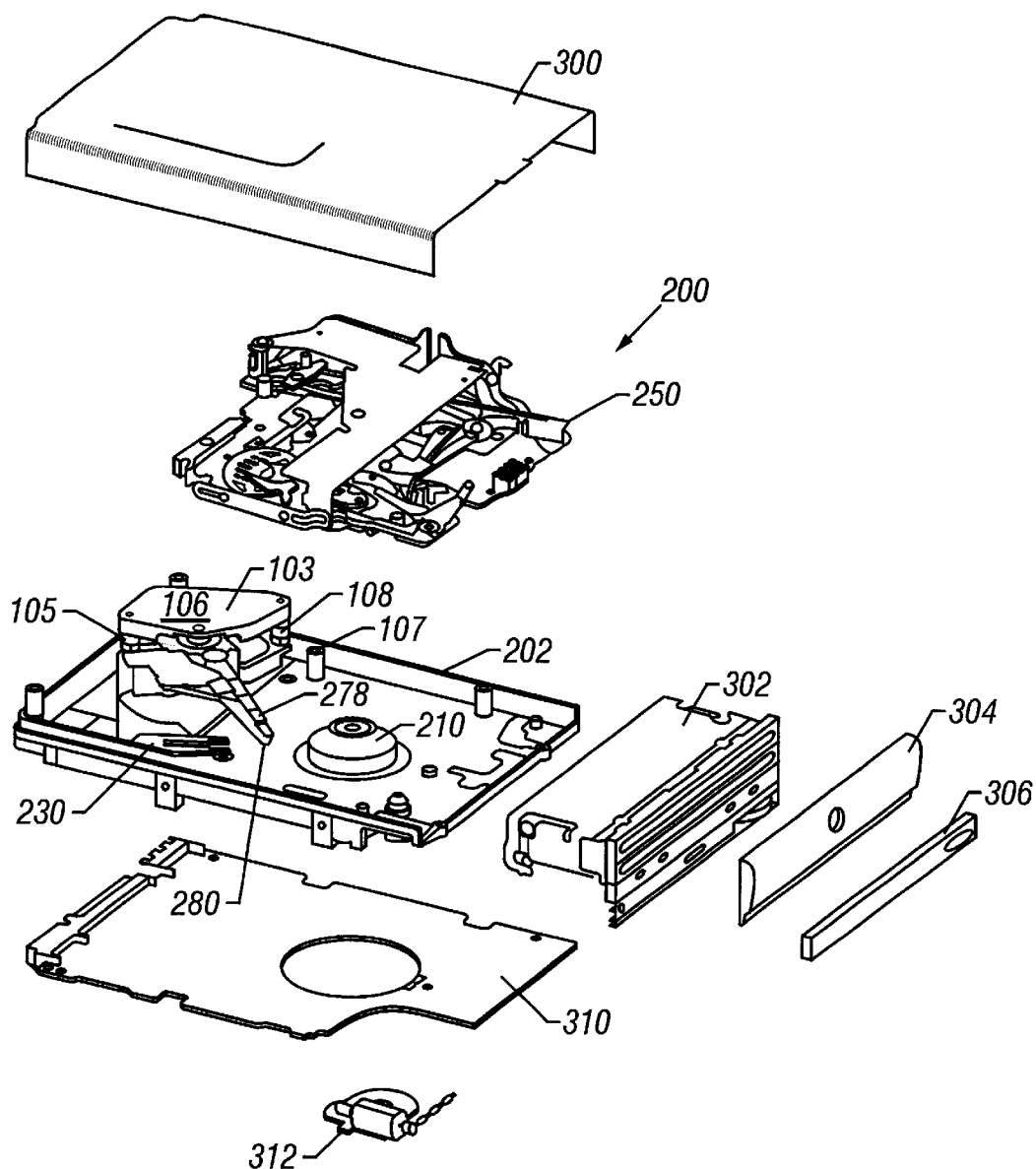
FIG. 4 shows an exploded view of an optical data storage device.

Referring now to FIG. 4, an exploded view of an optical data storage device is shown. A loader assembly 250 is positioned on top of the spindle motor 210 within the base gear 202. The loader assembly 250 accepts a cartridge carrier (not shown), loads the cartridge and opens a cartridge shutter for access by the flying head 280. The head 280 is engaged to a movable actuator arm 278. A ramp 239 is used to support the he actuator arm 278 when the head 280 is unloaded.

In one implementation, the read/write head 280 is a "flying" head that is suspended over an optical media by an air-bearing surface in a near-field recording configuration where the phasing between an exit facet of the flying head and a recording layer in the media is a fraction of a wavelength. The flying head includes a near-field lens with a high index of refraction and usually has a near-field condition. A focus beam with a spot size smaller than that obtainable from a conventional optical system is achieved due to the use of this high index solid immersion lens as the near-field lens. The optical read/write head of this embodiment is described in more detail in copending U.S. patent application Ser. No. 08/846,916, entitled "ELECTRO-OPTICAL STORAGE SYSTEM WITH FLYING HEAD OR NEAR-FIELD RECORDING AND READING," filed on Apr. 29, 1997.

The flying head 280 accesses an optical media on a platter (not shown) that can be writable/erasable materials (i.e., write-many-read-many), write-once-read-many materials, and read-only materials. The writable/erasable materials may include the magneto-optic type, including but not limited to, rare earth-transition metal compounds, and phase-change materials. A multilayer structure with at least one magneto-optic recording layer has a reversed layer construction compared to a conventional multilayer magneto-optic media. A first top dielectric layer, a magneto-optic recording layer, a second dielectric layer, and a reflective substrate may be formed in sequence. The optical media may also have a plurality of recording layers in a multilayer construction.

The cartridge carrier is used to minimize contamination by keeping a platter or disk out of reach of a user at all times. A special box-like carrier is used to "lock" a cartridge therein when the disk is not in use. The carrier includes a door for loading and unloading the cartridge. A special docking system is implemented in the drive. This system keeps a cartridge from being in direct contact with any objects other than the carrier and the drive. In loading a disk, the carrier is temporarily docked to the drive. The loading operation is performed using a load motor 312. The carrier door is then opened and the cartridge is automatically removed from the carrier and transferred into the drive. At this time, the empty carrier can be removed from the drive. In unloading a disk, an empty carrier is temporarily docked to the drive. The docking system automatically transfers the cartridge from the drive to the carrier. The cartridge enclosed in the carrier is then removed from the drive. The carrier door remains closed and locked if the carrier is not docked to the drive.

An actuator assembly 101 is mounted on the base 202. The actuator assembly 101 has top and bottom pole pieces 103 and 107, respectively. The top pole piece 103 has an opening that is adapted to receive a first standoff 109. The top pole piece 103 also has another opening that is adapted to receive a second standoff 105. The standoffs 105 and 109 are positioned in corresponding openings of the bottom pole piece 107. Particularly, the standoff 109 has a recessed region along its height between two hexagon nuts to provide room to slip a protective rubber that protects the read/write head 280 against damage due to a crash of a carriage containing the head.

To complete the assembly 200, a cover 300 is attached to the base gear 202. Further, a face plate assembly 302 is mounted to the front of the base gear 202 to provide data access information to the user through light-emitting diodes (LEDs) which, along with other electronic components, (e.g., the drive controller or microprocessor 314) are mounted on a printed circuit board 310. The face plate assembly 302 in turn engages a door 304 and a door panel 306.

Although the present invention has been described in detail with reference to the embodiments therein, one ordinarily skilled in the art to which this invention pertains will appreciate that various modifications and enhancements may be made without departing from the spirit and scope of the following claims.

What is claimed is:

1. A locking apparatus for a door comprising:
   a linkage adapted to actuate the door, the linkage having a handle with a notch and an edge;
   a flag having a pin mounted thereon, the pin being adapted to engage the edge when the door opens and to be seated in the notch to lock the door; and
   a lever to actuate the flag, thereby locking the door.

2. The apparatus of claim 1, further comprising a preload lever coupled to the lever.

3. The apparatus of claim 2, wherein the preload lever is spring-loaded.

4. The apparatus of claim 1, further comprising a torsion spring coupled to the flag.

5. The apparatus of claim 1, wherein the flag includes an arm adapted to enable or disable a signal to indicate door status.

6. The apparatus of claim 5, further comprising a detector coupled to the arm.

7. The apparatus of claim 6, further comprising a drive processor coupled to the detector.

8. The apparatus of claim 5, further comprising an opto-coupler having a recess to receive the arm.

9. The apparatus of claim 1, further comprising a cam-gear coupled to the lever.

10. The apparatus of claim 9, wherein the cam-gear drives the lever through a predetermined path.

11. A method for opening, closing and locking a data storage device door having a flag with a pin mounted thereon and a linkage coupled to the door and the flag, the linkage including a handle with a notch and an edge, the method comprising:

seating the pin in the notch to lock the door; and moving the pin along the edge to move the door.

12. The method of claim 11, further comprising moving the pin along a first direction to open the door.

13. The method of claim 12, further comprising moving the pin along a second direction opposite to the first direction to close the door.

14. The method of claim 13, further comprising suspending the door at an intermediate position when an obstacle is encountered.

15. The method of claim 11, further comprising notifying a controller that the door is open or closed based on the position of the flag.

16. A system for opening, closing and locking a door, the system comprising:

a flag having a pin mounted thereon;

a linkage having a handle with a notch and an edge;

means for seating the pin in the notch to lock the door; and means for moving the pin along the edge to open the door.

17. The system of claim 16, further comprising a lever coupled to the flag and a preload lever coupled to the lever.

18. The system of claim 16, further comprising a torsion spring coupled to the flag.

19. The system of claim 16, wherein the flag includes an arm adapted to enable or disable a signal to indicate door status.

20. The system of claim 19, further comprising a detector coupled to the arm to sense the position of the arm.

* * * * *